United States Patent
McBride et al.

(10) Patent No.: US 9,921,776 B2
(45) Date of Patent: Mar. 20, 2018

(54) EFFICIENT SIDEFILE UTILIZATION IN ASYNCHRONOUS DATA REPLICATION SYSTEMS

(71) Applicant: International Business Machines Corporation, Armonk, NY (US)

(72) Inventors: Gregory E. McBride, Vail, AZ (US); David C. Reed, Tucson, AZ (US); Warren K. Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/243,159

(22) Filed: Aug. 22, 2016

(65) Prior Publication Data

US 2018/0052604 A1    Feb. 22, 2018

(51) Int. Cl.
  *G06F 3/06*     (2006.01)
  *G06F 12/0802*  (2016.01)

(52) U.S. Cl.
  CPC ............ *G06F 3/065* (2013.01); *G06F 3/0619* (2013.01); *G06F 3/0685* (2013.01); *G06F 12/0802* (2013.01); *G06F 3/0625* (2013.01); *G06F 2212/60* (2013.01)

(58) Field of Classification Search
  CPC ..... G06F 3/065; G06F 3/0625; G06F 12/0802
  USPC ................................. 711/161, 118
  See application file for complete search history.

(56) References Cited

U.S. PATENT DOCUMENTS

| 6,192,422 | B1 |   | 2/2001 | Daines et al. |
| 6,408,348 | B1 | * | 6/2002 | Blount ................. G06F 13/385 370/230 |
| 6,842,835 | B1 | * | 1/2005 | Fujimoto .............. G06F 3/0611 711/162 |
| 7,930,497 | B2 |   | 4/2011 | Crockett et al. |
| 8,468,313 | B2 |   | 6/2013 | Yim et al. |
| 2002/0178356 | A1 | * | 11/2002 | Mattila ............... H04L 63/0442 713/156 |
| 2006/0085575 | A1 | * | 4/2006 | Hosouchi ............. G06F 3/0617 710/38 |
| 2006/0101213 | A1 | * | 5/2006 | Morita ............... G06F 11/2066 711/162 |
| 2006/0212667 | A1 | * | 9/2006 | Mikami ............... G06F 3/0613 711/162 |
| 2008/0010424 | A1 |   | 1/2008 | Morita |

* cited by examiner

*Primary Examiner* — Than Nguyen
(74) *Attorney, Agent, or Firm* — Nelson and Nelson; Daniel P. Nelson; Alexis V. Nelson

(57) ABSTRACT

A method to more efficiently utilize sidefiles in an asynchronous data replication system is disclosed. In one embodiment, such a method includes maintaining, in memory of a primary storage system, a set of sidefiles for mirroring record sets from the primary storage system to a secondary storage system. Each sidefile has a status of either active or inactive. The method further establishes an upper threshold and lower threshold for each sidefile. The method receives, into active sidefiles, record sets that need to be mirrored to the secondary storage system. When record sets in each of the actives sidefiles reaches the upper threshold, the method activates a deactivated sidefile. When record sets in an active sidefile fall below the lower threshold, the method deactivates and drains the sidefile. A corresponding system and computer program product are also disclosed.

20 Claims, 7 Drawing Sheets

EFFICIENT SIDEFILE UTILIZATION IN ASYNCHRONOUS DATA REPLICATION SYSTEMS

BACKGROUND

Field of the Invention

This invention relates to systems and methods for efficiently utilizing sidefiles in asynchronous data replication systems.

Background of the Invention

In z/OS Global Mirror, data is asynchronously mirrored from a primary storage system to a secondary storage system in order to maintain two consistent copies of data. The primary and secondary storage systems may be located at different sites, perhaps several hundred miles away from one another. In the event the primary storage system fails, I/O may be redirected to the secondary storage system, thereby enabling continuous operations.

When updates are received at the primary storage system, z/OS Global Mirror groups the updates into record sets and collects these record sets into data structures referred to as "sidefiles." These sidefiles are stored in cache at the primary storage system. The record sets in these sidefiles are asynchronously mirrored to the secondary storage system using data replication software (also known as System Data Mover, or SDM, in the z/OS environment) that is typically hosted on a secondary host system. This data replication software utilizes readers to copy data from the primary cache to the secondary storage system. Each reader or group of readers copies record sets from a specific sidefile in the primary cache to the secondary storage system. Currently, record sets are distributed to sidefiles in a round-robin manner. This ensures that record sets are distributed substantially equally among the sidefiles. Although effective, this technique may not be most efficient for all types of workloads, such as heavy or light workloads.

In view of the foregoing, what are needed are systems and methods to more effectively utilize sidefiles and associated resources in z/OS Global Mirror and other asynchronous data replication systems.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently utilize sidefiles in asynchronous data replication systems. The features and advantages of the invention will become more fully apparent from the following description and appended claims, or may be learned by practice of the invention as set forth hereinafter.

Consistent with the foregoing, a method to more efficiently utilize sidefiles in an asynchronous data replication system is disclosed. In one embodiment, such a method includes maintaining, in memory of a primary storage system, a set of sidefiles for mirroring record sets from the primary storage system to a secondary storage system. Each sidefile has a status of either active or inactive. The method further establishes an upper threshold and lower threshold for each sidefile. The method receives, into active sidefiles, record sets that need to be mirrored to the secondary storage system. When record sets in each of the actives sidefiles reaches the upper threshold, the method activates a deactivated sidefile. When record sets in an active sidefile fall below the lower threshold, the method deactivates and drains the sidefile.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
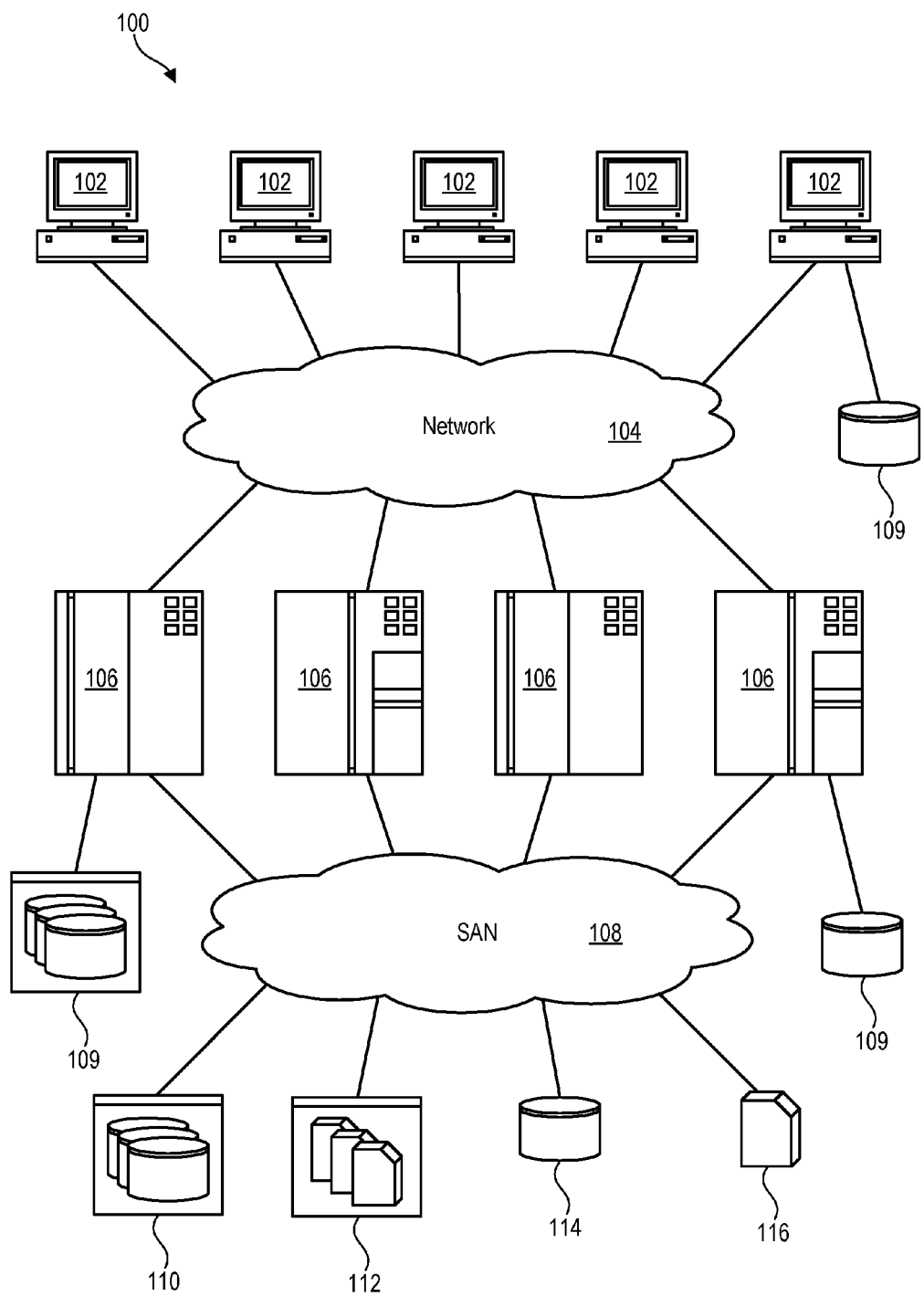
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
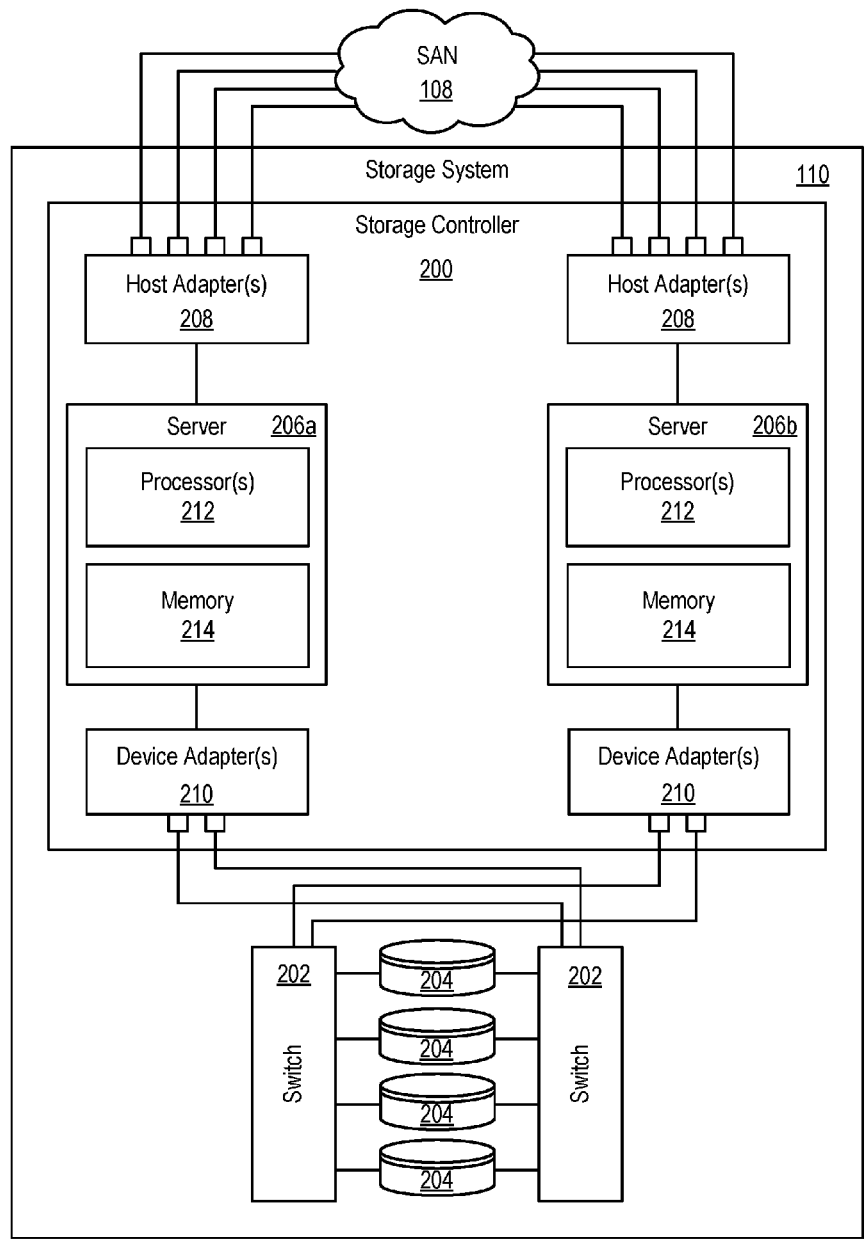
FIG. 2 is a high-level block diagram showing one example of a storage system that may be included in an asynchronous data replication system.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
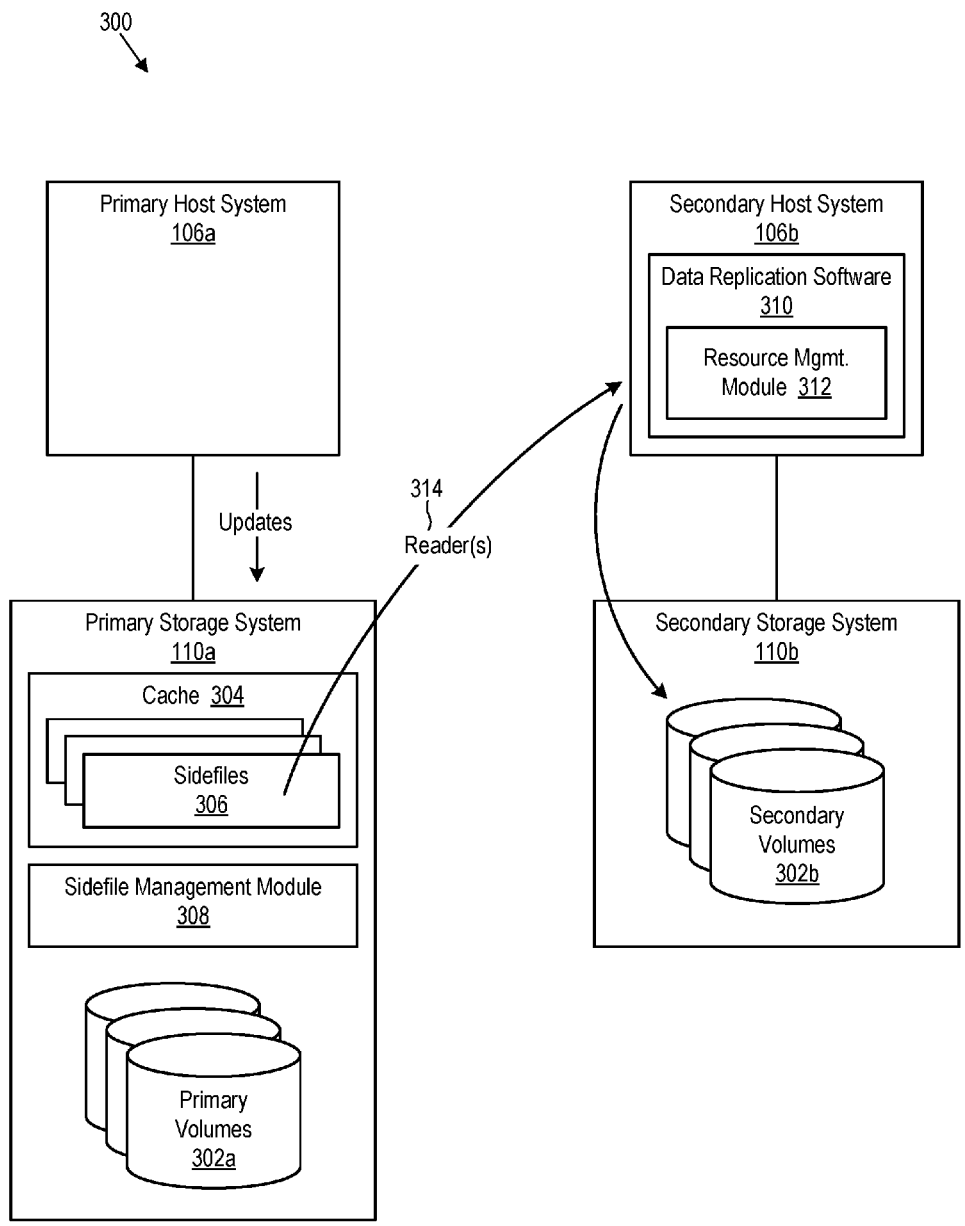
FIG. 3 is a high-level block diagram showing an asynchronous data replication system comprising a sidefile management module and resource management module in accordance with the invention, and further showing how sidefiles may be used in the asynchronous data replication system to mirror data to a secondary storage system.

Referring to FIG. 3, as previously mentioned, in z/OS Global Mirror, data is asynchronously mirrored from primary volumes 302a on a primary storage system 110a to secondary volumes 302b on a secondary storage system 110b in order to maintain two consistent copies of data. The primary and secondary storage systems 110a, 110b may be located at different sites, perhaps several hundred miles away from one another. In the event the primary storage system 110a fails, I/O may be redirected to the secondary storage system 110b, thereby enabling continuous operations.

When updates are received by the primary storage system 110a from a primary host system 106a, z/OS Global Mirror groups the updates into record sets and collects these record sets in data structures referred to as sidefiles 306. These sidefiles 306 are stored in cache 304 (a type of memory 214) of the primary storage system 110a. The record sets in these sidefiles 306 are asynchronously mirrored to the secondary storage system 110b using data replication software 310 (also known as System Data Mover, or SDM, in the z/OS environment) that is typically hosted on a secondary host system 106b. This data replication software 310 typically utilizes readers 314 to copy data from the sidefiles 306 to the secondary storage system 110b. Each reader 314 or group of readers 314 copies record sets from a specific sidefile 306 in the primary cache 304 to the secondary storage system 110b. Currently, record sets that are generated at the primary storage system 110a in response to updates are distributed to sidefiles 306 in a round-robin manner. This ensures that record sets are distributed substantially equally among the sidefiles 306. Although effective, this technique may not be most efficient for all types of workloads, such as heavy or light workloads.

In view of the foregoing, systems and methods are needed to more effectively utilize sidefiles 306 and associated resources in z/OS Global Mirror and other analogous data replication systems 300. Such systems and methods are disclosed in FIGS. 3 through 7. As shown in FIG. 3, in certain embodiments in accordance with the invention, a sidefile management module 308 may be provided in the primary storage system 110a to manage sidefiles 306, and more particularly activate and deactivate sidefiles 306 in accordance with the workload of the primary storage system 110a. The workload may vary in accordance with the volume of updates received by the primary storage system 110a. Higher workloads may require more active sidefiles 306 to receive record sets while lower workloads may require fewer active sidefiles 306 to receive record sets.

A resource management module 312 in the secondary host system 106b may be configured to manage resources assigned to the sidefiles 306. For example, readers and other resources may be allocated to the active sidefiles 306 to transfer record sets to the secondary storage system 110b. No readers and/or resources may be allocated to inactive sidefiles 306. In this way, the resource management module 312 may efficiently allocate resources where they are needed. The functionality of the sidefile management module 308 and resource management module 312 will be described in more detail in association with FIG. 6.

Figure 4:
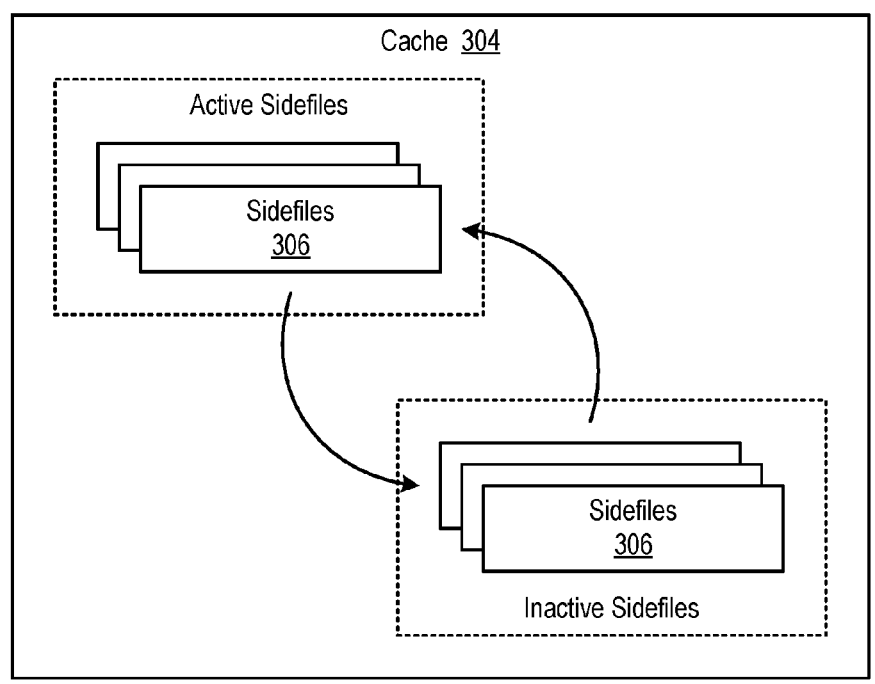
FIG. 4 is a high-level block diagram showing how sidefiles may be activated and deactivated based on characteristics of a workload.

Referring to FIG. 4, as explained above, one or more sidefiles 306 may be stored in cache 304 of the primary storage system 110a. These sidefiles 306 may store record sets that need to be transferred to the secondary storage system 110b. Instead of utilizing all of the sidefiles 306 to transfer record sets to the secondary storage system 110b, only certain sidefiles 306 may be used to ensure that resources are allocated efficiently. In the illustrated embodiment, the sidefiles 306 are divided into active sidefiles 306 and inactive sidefiles 306. Active sidefiles 306 may be used to transfer record sets to the secondary storage system 110b while inactive sidefiles 306 may lay dormant. When additional sidefiles 306 are needed to transfer record sets to the secondary storage system 110b, the sidefile management module 308 may activate one or more inactive sidefiles 306, up to a maximum number of sidefiles 306. Similarly, when more sidefiles 306 are active than are needed to transfer record sets to the secondary storage system 110b, the sidefile management module 308 may deactivate one or more active sidefiles 306. In this way, the sidefile management module 308 may maintain an optimal number of active sidefiles 306.

To provide the functionality described above, the sidefile management module 308 may establish an upper threshold and lower threshold for each of sidefile 306. When record sets in each active sidefile 306 reach the upper threshold, the sidefile management module 308 may activate a deactivated sidefile 306. Similarly, when record sets in an active sidefile 306 fall below the lower threshold, the active sidefile 306 may be deactivated and drained (i.e., have all record sets transferred from the sidefile 306 to the secondary storage system 110b). The sidefile 306 may then lay dormant until it is re-activated. In certain embodiments, the total number of sidefiles 306 may stay the same with sidefiles 306 transitioning between active and inactive status. Thus, in certain embodiments, the number of active sidefiles 306 is limited to the total number of sidefiles 306 or some other established limit.

Figure 5:
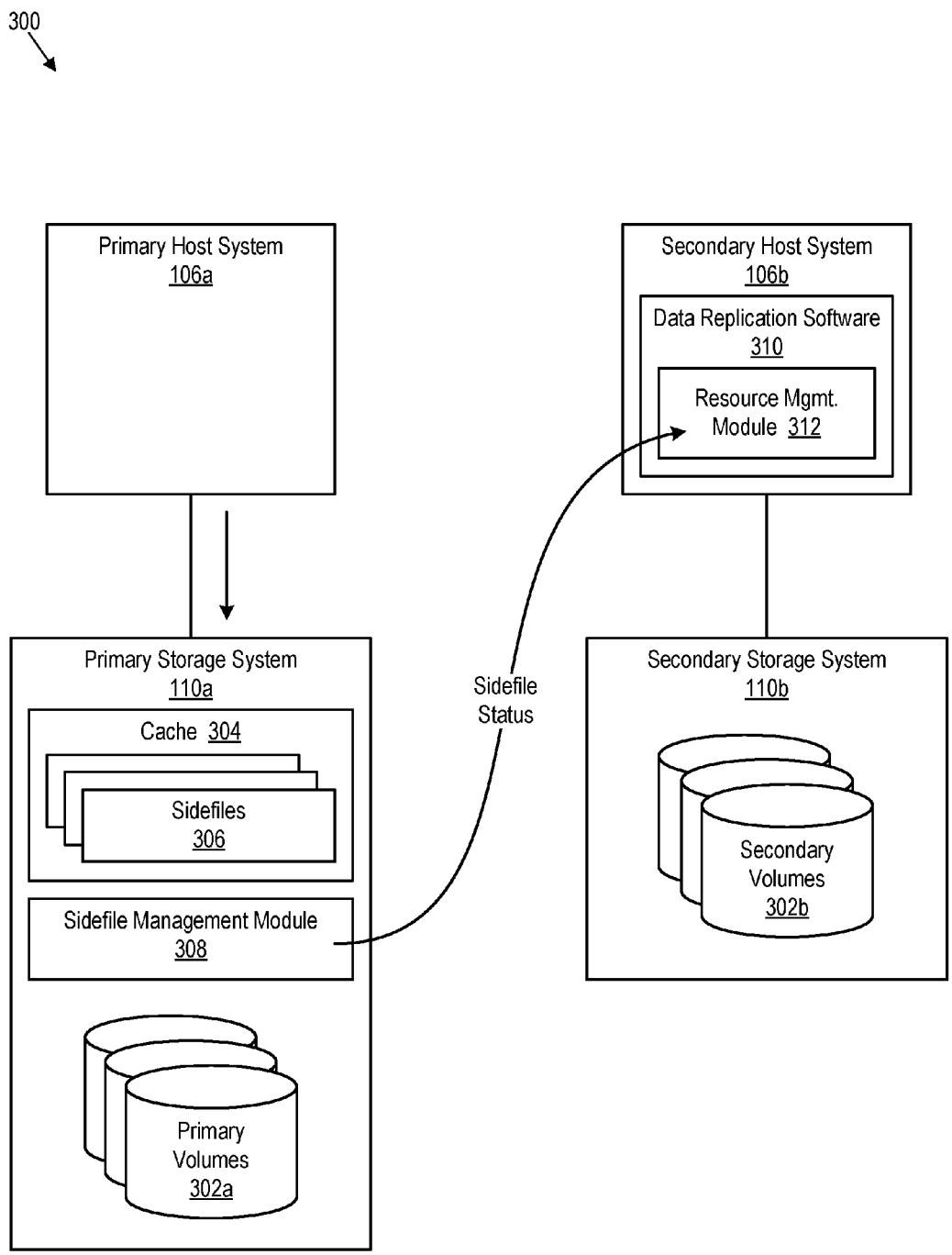
FIG. 5 is a high-level block diagram showing how sidefile status information may be communicated to a resource management module in accordance with the invention.

Referring to FIG. 5, in order to ensure that the resource management module 312 can efficiently allocate resources, the resource management module 312 may need information regarding which sidefiles 306 are active and inactive. State otherwise, the resource management module 312 needs to know which sidefiles 306 contain record sets for transfer to the secondary storage system 110b. Once this information is known, the resource management module 312 may allocate readers and other resources (e.g., buffers, channels, channel extenders, etc.) to those sidefiles 306 that contain record sets.

To provide the resource management module 312 needed information, the sidefile management module 308 may be configured to periodically, at intervals, or upon request notify the resource management module 312 of sidefiles 306 that are active. This enables the resource management module 312 to allocate resources (e.g. readers, buffers, channels, channel extenders, etc.) to active sidefiles 306, while at the same time preventing allocation of resources to inactive sidefiles 306. In certain embodiments, the sidefile management module 308 may return sidefile status information (i.e., which sidefiles 306 are active/inactive etc.) to the secondary storage system 110b in response to a query. Other techniques for notifying the resource management module 312 of the status of sidefiles 306 are possible and within the scope of the invention.

Figure 6A:
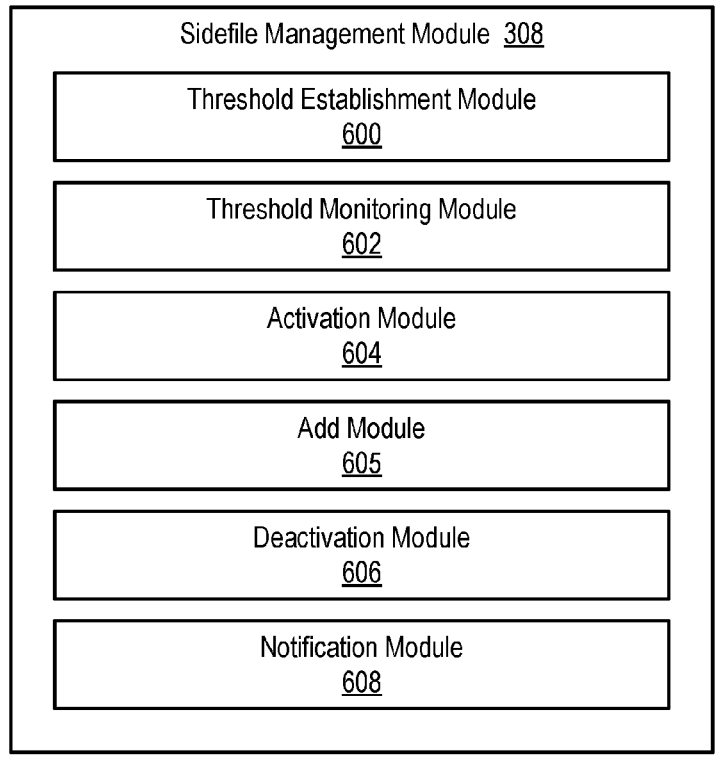
FIG. 6A shows various sub-modules that may be included in a sidefile management module in accordance with the invention.
Figure 6B:
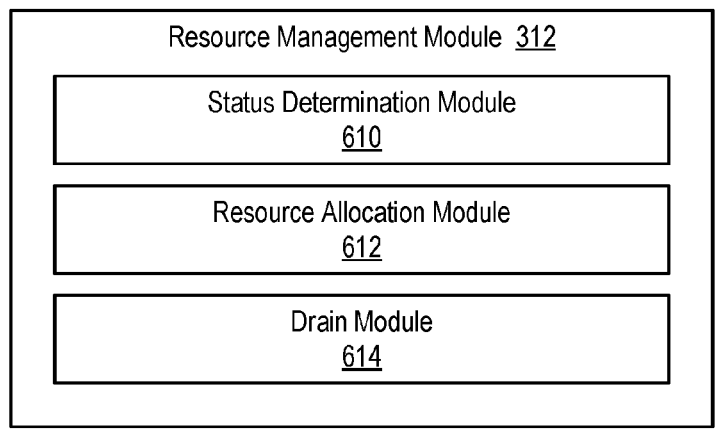
FIG. 6B shows various sub-modules that may be included in a resource management module in accordance with the invention.

Referring to FIGS. 6A and 6B, as shown, the sidefile management module 308 and resource management module 312 may include various sub-modules to provide various features and functions. These sub-modules may include one or more of a threshold establishment module 600, threshold monitoring module 602, activation module 604, add module 605, deactivation module 606, notification module 608, status determination module 610, resource allocation module 612, and drain module 614. These sub-modules are presented by way of example and are not intended to represent an exhaustive list of sub-modules that may be included within the sidefile management module 308 and resource management module 312. The sidefile management module 308 and resource management module 312 may include more or fewer sub-modules than those illustrated, or the functionality of the sub-modules may be organized differently.

The threshold establishment module 600 may be configured to establish an upper threshold and lower threshold for each sidefile 306. In certain embodiments, the upper threshold may be expressed as a maximum number of record sets a sidefile 306 may store to operate at a desired efficiency, while the lower threshold may be expressed as a minimum number of record sets a sidefile 306 may store to operate at a desired efficiency. The upper and lower thresholds may be selected based on the characteristics of the data replication system 300. For example, in z/OS Global Mirror (XRC), the upper threshold may be set at three times the number of record sets in a single instance of an XRC task that processes record sets, plus an optimal number of record sets for a read. The number of record sets in a single instance of an XRC task is 256. This number is multiplied by three since three XRC tasks may be outstanding at any given time. The optimal number of record sets for a read may be 112. This provides an upper threshold value of (256*3)+112=880. Keeping records sets at or near the upper threshold is much more efficient for keeping resources such as a channel and channel extenders full. The lower threshold may be set to correspond to the optimal number of record sets for a read, or 112 in this example.

The threshold monitoring module 602 may monitor the number of record sets in active sidefiles 306. When record sets in each of the active sidefiles 306 reaches the upper threshold, the activation module 604 may activate a deactivated sidefile 306. The add module 605 may then add record sets to this activated sidefile 306 for transfer to the secondary storage system 110b. In certain embodiments, the add module 605 may distribute record sets to active sidefiles 306 in such a way that the active sidefiles 306 contain a substantially equal number of record sets, although this is not necessary in all embodiments. In certain embodiments, when a sidefile 306 is newly activated, the sidefile 306 will be empty and records sets may be added to the sidefile 306 faster than to other active sidefiles 306 to bring it up to or near the level of the other active sidefiles 306. Once the levels are close to being equal, the add module 605 may distribute records sets to the sidefiles 306 in a manner that will maintain a substantially equal number of record sets in each active sidefile 306. When record sets in an active sidefile 306 fall below the lower threshold, the deactivation module 606 may deactivate the sidefile 306. No additional record sets may be added to the sidefile 306 once deactivated. The notification module 608 may periodically, at intervals, or upon request notify the resource management module 312 which sidefiles 306 are active and/or inactive.

The status determination module 610 may be configured to determine the status of sidefiles 306 in cache 304 of the primary storage system 110a, namely whether the sidefiles 306 are active or inactive. Once this is known, the resource allocation module 612 may be able to efficiently allocate resources. For example, resources (reader tasks, buffers, channels, channel extenders, etc.) may be allocated exclusively to active sidefiles 306. If a sidefile 306 has been recently deactivated, the drain module 614 may drain the sidefile 306 of any remaining record sets. The resource allocation module 612 may then de-allocate resources from the deactivated sidefile 306.

When a sidefile 306 is activated by the activation module 604, the add module 605 may wait to add record sets to the activated sidefile 306 until the resource management module 312 knows the sidefile 306 is active. Thus, in certain embodiments, the add module 605 may wait until the resource management module 312 is notified of the newly activated sidefile 306 and the resource management module 312 begins to allocate resources to the sidefile 306. Once it is observed that resources are being allocated to the sidefile 306, the add module 605 may begin to add record sets to the sidefile 306 for transfer to the secondary storage system 110b.

Figure 7:
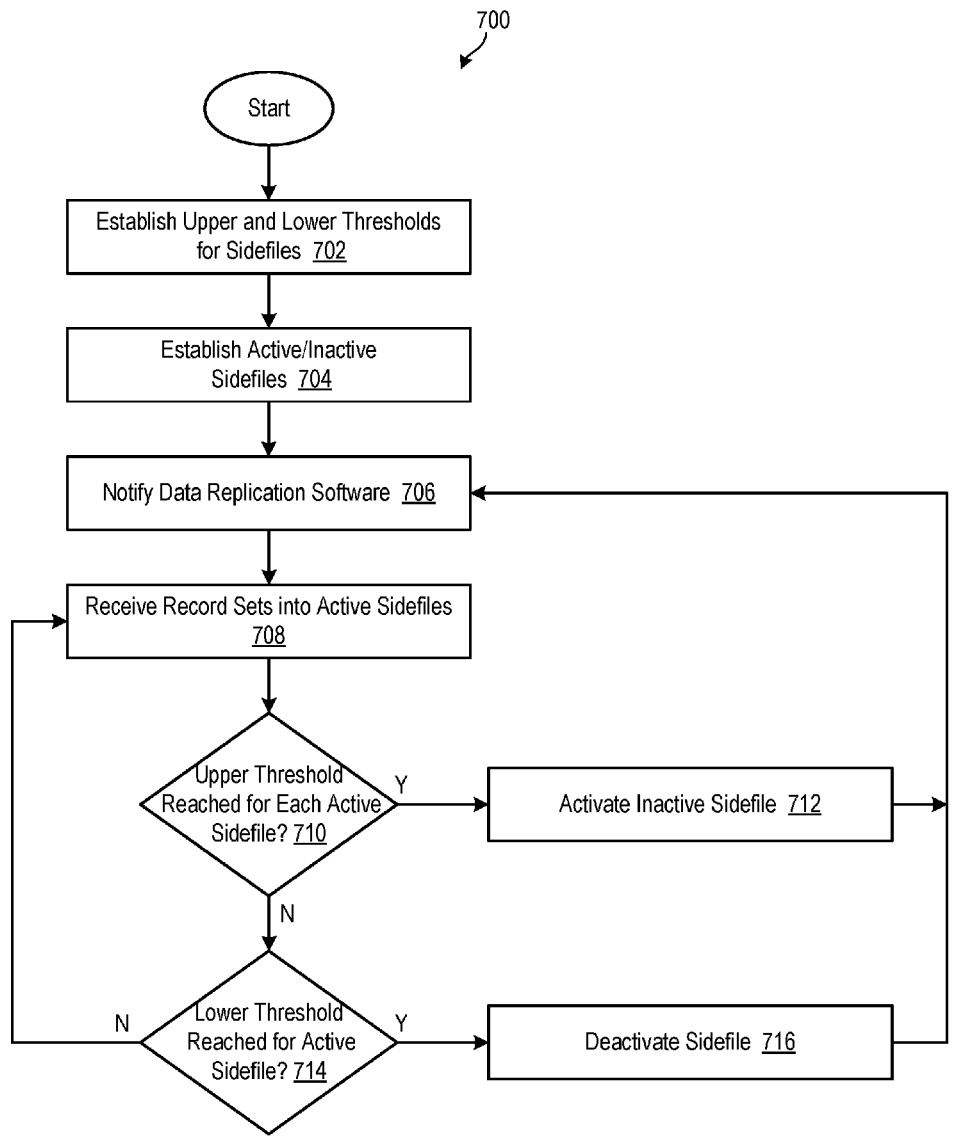
FIG. 7 is a process flow diagram showing one embodiment of a method for managing sidefiles in the asynchronous data replication system illustrated in FIGS. 3 and 5.

Referring to FIG. 7, one embodiment of a method 700 for managing sidefiles 306 in an asynchronous data replication system 300 such as XRC is illustrated. In certain embodiments, the method 700 may be executed by the sidefile management module 308 previously discussed. As shown, the method 700 initially establishes 702 upper and lower thresholds for each of the sidefiles 306 in cache 304 of the primary storage system 110a. The method 700 then establishes 704 which sidefiles 306 are initially active/inactive. In certain embodiments, all sidefiles 306 or some subset of the sidefiles 306 may initially be active. The method 700 may then notify 706 the data replication software 310 on the secondary host system 106b of the sidefiles 306 that are active. This will allow the data replication software 310 to allocate resources to the active sidefiles 306.

Once the data replication software 310 knows which sidefiles 306 are active and begins to allocate resources thereto, the method 700 receives 708 record sets into the active sidefiles 306. While receiving record sets into the active sidefiles 306, the method 700 determines 710 whether the upper threshold has been reached for each active sidefile 306. The active sidefiles 306 should contain a substantially equal number of record sets. If the upper threshold has been reached, the method 700 activates 712 a formerly inactive sidefile 306 and notifies 706 the data replication software 310 which sidefile 306 has been activated. This will allow the data replication software 310 to allocate resources thereto.

If the upper threshold has not been reached, the method 700 determines 714 whether the lower threshold has been reached for any active sidefile 306. If the lower threshold has been reached, the method 700 deactivates 716 the sidefile 306 and notifies 706 the data replication software 310 that the sidefile 306 has been deactivated. Once the data replication software 310 knows that the sidefile 306 has been deactivated, the data replication software 310 drains the sidefile 306 of record sets until it is empty and stops allocating resources thereto.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to more efficiently utilize sidefiles in an asynchronous data replication system, the method comprising:
    maintaining, in memory of a primary storage system, a set of sidefiles for mirroring record sets from the primary storage system to a secondary storage system, each sidefile having a status of either active or inactive;
    establishing an upper threshold and a lower threshold for the sidefiles;
    receiving, into active sidefiles, record sets that need to be mirrored to the secondary storage system;
    activating a deactivated sidefile when record sets in each of the actives sidefiles reaches the upper threshold; and
    deactivating and draining an active sidefile when record sets in the active sidefile fall below the lower threshold.

2. The method of claim 1, further comprising communicating, to data replication software reading the sidefiles, which sidefiles are active.

3. The method of claim 2, wherein the data replication software resides on a secondary host system.

4. The method of claim 2, further comprising delaying receiving record sets into an active sidefile until the data replication software is informed that the active sidefile is active.

5. The method of claim 4, wherein delaying receiving record sets into an active sidefile comprises waiting until the data replication software starts reading from the active sidefile.

6. The method of claim 1, wherein receiving record sets into the active sidefiles comprises distributing the records sets such that the active sidefiles contain a substantially equal number of record sets.

7. The method of claim 1, wherein the sidefiles are stored in cache of the primary storage system.

8. A computer program product to more efficiently utilize sidefiles in an asynchronous data replication system, the computer program product comprising a non-transitory computer-readable storage medium having computer-usable program code embodied therein, the computer-usable program code comprising:
    computer-usable program code to maintain, in memory of a primary storage system, a set of sidefiles for mirroring record sets from the primary storage system to a secondary storage system, each sidefile having a status of either active or inactive;
    computer-usable program code to establish an upper threshold and a lower threshold for the sidefiles;
    computer-usable program code to receive, into active sidefiles, record sets that need to be mirrored to the secondary storage system;
    computer-usable program code to activate a deactivated sidefile when record sets in each of the actives sidefiles reaches the upper threshold; and
    computer-usable program code to deactivate and drain an active sidefile when record sets in the active sidefile fall below the lower threshold.

9. The computer program product of claim 8, further comprising computer-usable program code to communicate, to data replication software reading the sidefiles, which sidefiles are active.

10. The computer program product of claim 9, wherein the data replication software resides on a secondary host system.

11. The computer program product of claim 9, further comprising computer-usable program code to delay receiving record sets into an active sidefile until the data replication software is informed that the active sidefile is active.

12. The computer program product of claim 11, wherein delaying receiving record sets into an active sidefile comprises waiting until the data replication software starts reading from the active sidefile.

13. The computer program product of claim 8, wherein receiving record sets into the active sidefiles comprises distributing the record sets such that the active sidefiles contain a substantially equal number of record sets.

14. The computer program product of claim 8, wherein the sidefiles are stored in cache of the primary storage system.

15. A system to more efficiently utilize sidefiles in an asynchronous data replication system, the system comprising:
- at least one processor;
- at least one memory device operably coupled to the at least one processor and storing instructions for execution on the at least one processor, the instructions causing the at least one processor to:
  - maintain, in memory of a primary storage system, a set of sidefiles for mirroring record sets from the primary storage system to a secondary storage system, each sidefile having a status of either active or inactive;
  - establish an upper threshold and a lower threshold for the sidefiles;
  - receive, into active sidefiles, record sets that need to be mirrored to the secondary storage system;
  - activate a deactivated sidefile when record sets in each of the actives sidefiles reaches the upper threshold; and
  - deactivate and drain an active sidefile when record sets in the active sidefile fall below the lower threshold.

16. The system of claim 15, wherein the instructions further cause the at least one processor to communicate, to data replication software reading the sidefiles, which sidefiles are active.

17. The system of claim 16, wherein the data replication software resides on a secondary host system.

18. The system of claim 16, wherein the instructions further cause the at least one processor to delay receiving record sets into an active sidefile until the data replication software is informed that the active sidefile is active.

19. The system of claim 18, wherein delaying receiving record sets into an active sidefile comprises waiting until the data replication software starts reading from the active sidefile.

20. The system of claim 15, wherein receiving record sets into the active sidefiles comprises distributing the record sets such that the active sidefiles contain a substantially equal number of record sets.

* * * * *